US008275641B2

(12) United States Patent
Sethna

(10) Patent No.: US 8,275,641 B2
(45) Date of Patent: Sep. 25, 2012

(54) SYSTEM AND METHOD FOR BOARDING PASSENGERS BASED ON BIDS

(76) Inventor: Shaun Beheruz Sethna, Houston, TX (US)

( * ) Notice: Subject to any disclaimer, the term of this patent is extended or adjusted under 35 U.S.C. 154(b) by 21 days.

(21) Appl. No.: 13/051,816

(22) Filed: Mar. 18, 2011

(65) Prior Publication Data

US 2011/0166899 A1 Jul. 7, 2011

Related U.S. Application Data

(62) Division of application No. 12/221,734, filed on Aug. 6, 2008, now Pat. No. 8,050,950.

(51) Int. Cl.
*G06Q 10/00* (2012.01)
*G06Q 40/00* (2012.01)

(52) U.S. Cl. .................. 705/5; 705/6; 705/37
(58) Field of Classification Search ................ 705/5, 6, 705/37
See application file for complete search history.

(56) References Cited

U.S. PATENT DOCUMENTS

| | | | |
|---|---|---|---|
| 6,112,185 A * | 8/2000 | Walker et al. ............... | 705/5 |
| 2002/0022896 A1* | 2/2002 | Dugan ...................... | 700/83 |
| 2003/0036928 A1* | 2/2003 | Kenigsberg et al. .......... | 705/5 |
| 2003/0216973 A1* | 11/2003 | Walker et al. ............... | 705/26 |
| 2003/0225600 A1* | 12/2003 | Slivka et al. ............... | 705/5 |
| 2005/0125266 A1* | 6/2005 | Bramnick et al. ........... | 705/5 |
| 2005/0144115 A1* | 6/2005 | Brett ........................ | 705/37 |
| 2007/0043598 A1* | 2/2007 | Bertram et al. ............. | 705/5 |
| 2009/0287596 A1* | 11/2009 | Torrenegra .................. | 705/37 |

OTHER PUBLICATIONS

"Whats the deal with NW checkin and bump bids?," published by www.flyertalk.com on Jul. 19, 2008, pp. 1-6.*
"Probabilistically Optimized Airline Overbooking Strategies," by Leder et al. published by the UMAP Journal on Mar. 23, 2002, pp. 1-22.*
Steven Pearlstein, Airline Delays, published Oct. 3, 2007, available at http://www.washingtonpost.com/wp-dyn/content/discussion/2007/10/02/DI2007100201283.html.
Bill McGee, Doing the bump: Know your rights when you lose your seat, published Nov. 21, 2006, available at http://www.usatoday.com/travel/columnist/mcgee/2006-11-21-mcgee_x.htm.
Ed Perkins, Bumping compensation shows improvement, published Apr. 27, 2008, available at http://www.chicagotribune.com/travel/chi-airline-bumping-perkins_cm_papr27,0,102772.story.
Airline Bumping—What you Need to Know, published May 17, 2008, available at http://www.travelsense.org/consumer/airlinebumping.cfm.

(Continued)

*Primary Examiner* — John Hayes
*Assistant Examiner* — Brian Epstein

(57) ABSTRACT

Systems and methods for boarding passengers on flights or other transportation according to bids received from the passengers are provided. Passengers seeking to fly standby on an undersold flight can submit a bid representing the amount the passengers are willing to pay to board the flight. The airline can determine the number of seats available on the flight, and board the highest bidding passengers until the flight is full. Similarly, passengers willing to be bumped from an oversold flight can submit a bid representing the incentive the passengers are willing to accept to be bumped from the flight. The airline can determine the number of passengers that must be bumped from the flight, and bump the lowest bidding passengers (i.e., those willing to accept the least costly incentive) until a sufficient number of passengers have been bumped from the flight.

20 Claims, 6 Drawing Sheets

OTHER PUBLICATIONS

Melinda Fulmer, How to win the airline bumping game, published Jun. 1, 2007, available at http://articles.moneycentral.msn.com/SavingandDebt/TravelForLess/HowToWinTheAirlineBumping-Game.aspx?page=2.

Delays, Strikes, and Overbooking, published Jul. 10, 2006, available at http://www.fodors.com/news/story_1369.html.

Everything you ever wanted to know about bumping, published Jul. 26, 2007, available at http://www.smartertravel.com/travel-advice/everything-you-ever-wanted-to-know-about-bumping.html?id=2396101.

"ABA Family Legal Guide ABA family Legal Guide Contracts and Consumer Law, published 2004, available at http://public.findlaw.com/abaflg/flg-9-3j-2.html".

Kent St. John, Know Your Rights: Airline Passenger Rights, published Jan. 4, 2005, available at http://www.gonomad.com/traveldesk/0101/stjohn_airlinerights.html.

Bumping games: how American redefined 'denied boarding', published Apr. 24, 2008, available at http://www.elliott.org/blog/bumping-games-how-american-redefined-denied-boarding/.

Jessica Labrencis, Airfare Q&A: Are the perks of bumping worth the inconvenience?, published Sep. 30, 2004, available at http://www.smartertravel.com/travel-advice/Airfare-perks-bumping-worth.html?id=10043.

If You Get Bumped Off a Flight, published Sep. 24, 2006, available at http://www.atg.wa.gov/teenconsumer/recreation/if_you_get_bumped_off_of_a_flight.htm.

Bumping and Overbooking, published Dec. 2, 2008, available at http://www.independenttraveler.com/resources/article.cfm?AID=15&category=1.

More Fliers Forced to Give Up Seats, published Oct. 12, 2006, available at http://www.travellaw.com/page/more-fliers-forced-give-seats.

Kimberly Lankford, Bump Me, Please . . . For a Price—airline scheduling—Brief Article, published Dec. 1999, available at http://findarticles.com/p/articles/mi_m1318/is_12_53/ai_57799981/.

Airline code for Voluntary Bump, published Jan. 2, 2008, available at http://www.tugbbs.com/forums/showthread.php?t=61680.

Jim Wang, Why Can Airlines Overbook Flights?, published Sep. 5, 2007, available at http://www.bargaineering.com/articles/why-can-airlines-overbook-flights.html.

Overbooking Flights, published Sep. 1994, available at http://www.armchair.com/info/overbook.html.

Julian L. Simon, Origins of the Airline Oversales Auction System, published 1994, available at http://www.cato.org/pubs/regulation/regv17n2/reg17n2-simon.html.

Patrick Crowley, Things That Go Bump in the Terminal, published Sep. 25, 1999, available at http://www.thestreet.com/story/786722/things-that-go-bump-in-the-terminal.html.

Denied Boarding, published Mar. 15, 2008, available at http://www.flightmole.com/denied_boarding.htm.

Jane Bennett Clark, Win the Bumping Game, published Nov. 9, 2007, available at http://www.kiplinger.com/features/archives/2004/01/travel.html.

When an Aviation Lawyer Gets Bumped, the Airline Pays, published Nov. 22, 2005, available at http://volokh.com/posts/1132664350.shtml.

Aaron Karp, DOT seeks comments on changing 'bumping' rules, published Jul. 10, 2007, available at http://atwonline.com/international-aviation-regulation/news/dot-seeks-comments-changing-bumping-rules-0709.

Cindy Loose, Overbooked Flights: What's It Worth to You?, published Oct. 3, 2007, available at http://voices.washingtonpost.com/travellog/2007/10/overbooked.html.

DOT considering whether to increase denied boarding compensation, published Aug. 21, 2007, available at http://nvflyer.wordpress.com/2007/08/21/dot-considering-whether-to-increase-denied-boarding-compensation/.

Involuntary Denied Boarding Sucks, published Nov. 17, 2007, available at http://www.consultantninja.com/2007/11/involuntary-denied-boarding-sucks.html.

Chris Woodyard,, Unlike rivals, JetBlue won't do the bump, published Oct. 23, 2003, available at http://www.usatoday.com/money/biztravel/2003-10-23-overbook_x.htm.

Paul Grimes, Practical Traveler; Airline Cost-Cutting, published Jan. 17, 1982, available at http://www.nytimes.com/1982/01/17/travel/practical-traveler-airline-cost-cutting.html.

Chris McGinnis, Got bumped? Here's how to get paid, published Oct. 28, 2003, available at http://articles.cnn.com/2003-10-28/travel/hln.adviser.bumped_1_involuntary-bumps-original-arrival-time-destination-within-one-hour?_s=PM:TRAVEL.

Meg Marco, How to Get Bumped by an Airline for Fun and Profit, published Jul. 2, 2007, available at http://consumerist.com/2007/07/how-to-get-bumped-by-an-airline-for-fun-and-profit.html.

Will I End Up Being "Bumped"? Strategies, Advice and Compensation, published Mar. 10, 2001, available at http://www.flyertalk.com/forum/delta-skymiles-pre-worldperks-merger/510182-will-i-end-up-being-bumped-strategies-advice-compensation.html.

Travel Tips: How To Take The Bump and Like It, published Jul. 2, 2007, available at http://www.jaunted.com/story/2007/7/1/202529/8455/travel/Travel+Tips:+How+To+Take+The+Bump+And+Like+It.

Airline Overbooking: If you're bumped, what are your rights?, published 2006, available at http://www.airguideonline.com/airguidemonthly/airguide0003.htm.

New EU law over air misery, published Jul. 16, 2003, available at http://news.bbc.co.uk/2lhi/business/3040432.stm.

Stephen Castle, Air travellers win new compensation rights, published Feb. 18, 2005, available at http://www.independent.co.uk/news/world/europe/air-travellers-win-new-compensation-rights-483815.html.

Susan Stellin, If You Choose to Be Bumped, published Jul. 27, 2003, available at http://www.suddenlysenior.com/choosetobebumped.html.

George Hobica, How to Cope With Air-Travel Frustrations, published Jul. 2, 2007, available at http://www.realsimple.com/work-life/travel/cope-air-travel-frustrations-10000001125433/index.html.

Can Your Flight Be Legally Overbooked?, published Feb. 3, 2008, available at http://www.content4reprint.com/recreation-and-leisure/can-your-flight-be-legally-overbooked.htm.

The bump grind, published Nov. 26, 2005, available at http://www.elliott.org/power-trip/the-bump-grind/.

* cited by examiner

SYSTEM AND METHOD FOR BOARDING PASSENGERS BASED ON BIDS

CROSS-REFERENCE TO RELATED APPLICATIONS

This application is a divisional application of U.S. patent application Ser. No. 12/221,734 titled "System and Method for Boarding Passengers Based on Bids," filed on Aug. 6, 2008, the complete disclosure of which is hereby incorporated by reference herein.

TECHNICAL FIELD

The invention relates to systems and methods for receiving bids from passengers and boarding passengers based on those bids. More particularly, the invention relates to receiving bids from passengers—such as airline passengers—seeking to travel standby or willing to be "bumped" from their reserved seat and selecting which passengers to board based on those bids.

BACKGROUND

Airlines and other transportation carriers generally seek to maximize the number of passengers on each flight. Empty seats can represent lost revenue, and the marginal cost incurred by an airline by boarding an extra passenger is relatively small. Thus, minimizing the number of empty seats on a flight can maximize the profit for the airline.

Because of the lost revenue associated with empty seats on a given flight, airlines generally sell a greater number of tickets for a flight than there are total seats. The airlines assume that at least a portion of the tickets will go unused, and therefore overselling can help the airline minimize the number of empty seats on each flight.

Except in the rare case where an airline will successfully oversell a flight by the precisely correct number of seats, as flights approach their departure time there are generally either too many or too few passengers ready to board the flight. For example, if the airline oversold the flight, and in doing so, overestimated the number of passengers that would cancel their reservation, the flight is considered overbooked or oversold. In such cases, certain passengers, even though they may have boarding passes for the flight, may be asked to give up their seats on the flight and board a different flight to their destination, otherwise known as "bumping" the passenger from their original flight.

In other cases, flights may be underbooked or undersold. This may be because the airline oversold the flight but underestimated the number of passengers that would cancel their reservation. Alternatively, the airline may not have oversold the flight in the first place. Regardless of the reason, when a given flight is undersold, the airline may allow other passengers to board the flight, even if they did not have a ticket for the flight. Often times, these so-called passengers may have a ticket for a later flight to the same destination on the same airline, but have arrived in time to catch the earlier flight and seek to fly standby on the earlier flight. These standby passengers can board the earlier flight and give up their seat on the later flight. This can be advantageous to the airline because it reduces the number of empty seats on the earlier flight, and allows the airline additional time to replace the passenger's seat on the later flight.

Conventional policies for boarding standby passengers on undersold flights and "bumping" passengers from oversold flights can vary. For example, conventional airlines often charge a fee to standby passengers, in an attempt to capture extra revenue from passengers seeking to change their flight. Conversely, when determining which passengers to bump from oversold flights, airlines often provide a voucher or other financial incentive to passengers willing to give up their seats in exchange for seats on a later flight.

These conventional policies and methods for charging fees to standby passengers and providing financial incentives to those passengers willing to give up their seats both pose certain problems for airlines. For example, airlines charging fees for standby passengers often struggle to determine the optimal standby fee. They often must use principles of supply and demand to set a fee sufficiently high to generate significant revenue, but not so high to deter a significant number of passengers from flying standby. This optimal fee can be difficult to estimate, and any fee other than the optimal fee can result in lost profits. Furthermore, setting one optimal—or even near optimal—fee for all flights can be impossible, given that different flights of an airline may have vastly different passenger demands based on a variety of factors such as the routes, time of year, and time of departure for the flight.

With respect to incentivizing passengers willing to be bumped from their flights, airline policies generally involve offering a certain incentive to passengers to exchange their seat for a later flight, and repeatedly increasing the incentive until a sufficient number of passengers have given up their seats. According to conventional airline policies, all bumped passengers may receive the identical incentives, equal to the latest (and highest) amount offered by the airline. Thus, under the conventional model, some passengers may receive a greater financial incentive than what they would be willing to accept to give up their seats, thus representing an extra cost to the airline.

Another deficiency with the conventional model for providing financial incentives to bumped passengers is that the airline generally announces the type and amount of financial incentive and the number of seats by which the flight has been oversold. This often occurs at the departure gate for the flight, with willing passengers approaching the airline staff to accept a given financial incentive. This model can allow passengers to see how many seats are needed, and how many passengers have given up their seats. Passengers thus can try to "game" the system, by waiting for the incentive to increase until it seems that almost enough passengers have given up their seats before giving up theirs, even if they would have been willing to take a lower financial incentive to do so. This behavior, allowed by the conventional model, also can result in increased cost to the airline.

Thus, a need in the art exists for a system and method for determining which standby passengers to board an undersold flight and for determining which passengers to bump from an oversold flight that lacks the deficiencies associated with conventional models. Specifically, a need in the art exists for a method for determining which standby passengers to board a flight that reduces or eliminates the need for an airline to determine a set standby fee to charge passengers. A need in the art also exists for a method for determining which standby passengers to board a flight that increases the airline's profits by accounting for the different supply and demand for standby seats on different flights. Another need in the art exists for a method for determining which passengers to bump from an oversold flight that reduces the extra costs to the airline associated with providing each bumped passenger with the same financial incentive. Yet another need in the art exists for a method for determining which passengers to bump from an oversold flight that reduces the costs associated with passengers knowing the financial incentives that other passengers are willing to accept to be bumped from the flight.

SUMMARY OF THE INVENTION

The invention described herein can provide a system and method for seating passengers on oversold and undersold flights or other transportation that address the deficiencies in the prior art. Specifically, the inventions can receive bids from ticketed or potential passengers, and determine which of those passengers to board on a flight based on those bids.

In one aspect, the invention can provide a system and method for receiving bids from passengers seeking to fly standby on an undersold flight, and determining which of those passengers to board on the flight. After determining that a flight has been undersold (i.e., that empty seats would remain after boarding all ticketed passengers), the airline can announce to standby passengers that seats are available on the flight. The airline can invite interested standby passengers to submit a bid, representing the amount of money that the passengers would be willing to pay to be seated on the flight.

After receiving bids from the standby passengers, the airline can determine how many seats are available on the flight. The airline then can select the highest bid, board the passenger who submitted the highest bid, and continue boarding passengers in descending order of the bid they submitted until the flight is full. For example, if there are forty total seats on a flight and there are thirty ticketed passengers, the airline can board the standby passengers who submitted the ten highest bids.

Boarding standby passengers according to the bids they submitted can increase the revenue and/or profits to the airline when compared to conventional systems and methods. By allowing each standby passenger to submit a bid, the need for the airline to set a predetermined standby fee is removed. Such a system therefore can reduce or remove the problems of setting a standby fee too low (thereby forgoing revenue on high demand flights where passengers would be willing to pay more than the standby fee) or too high (thereby forgoing revenue on lower demand flights where passengers would be willing to pay less than the standby fee). Receiving bids from the passengers can automatically adjust the standby fees charged to the passengers for the relative supply and demand for a given flight. Only the highest bidding passengers will obtain seats on high demand flights. Conversely, on lower demand flights where many seats are available, more seats may be filled with standby passengers as long as they are willing to bid on the seats, even if some passengers bid less than a conventional airline's standby fee.

In another aspect, the invention can provide a system and method for receiving bids from ticketed passengers on an oversold flight, and determining which of those passengers to move or bump from the flight based on the passengers' bids. After determining that an airline's flight is oversold, the airline can announce to the passengers of the flight that it is oversold, and that passengers may volunteer to be bumped from the flight. The airline can invite interested passengers to submit a bid, representing the incentive that the passenger would accept to be bumped from the flight. The bids received by the passengers can include a monetary reward, such as a cash payment or a voucher to use on future travel for the airline. The bid also can include a request for a replacement seat on a specific later flight to the passenger's destination.

After receiving the bids from the passengers, the airline can determine how many passengers it needs to bump from the flight by subtracting the total number of seats on the flight from the number of ticketed passengers for the flight. The airline then can sort the bids according to the value of the bids. The airline then can select the lowest bid, bump the passenger who submitted the lowest bid, and provide the appropriate incentive to the bumped passenger. Providing the incentive to the bumped passenger can include paying the passenger the value of the passenger's bid, as well as providing a confirmed ticket and/or boarding pass for the specific later flight selected by the passenger. The airline then can continue bumping passengers and providing appropriate incentives to the bumped passengers in ascending order of the bid they submitted until a sufficient number of passengers have been bumped from the flight.

Bumping passengers according to the bids they submitted can reduce the costs and/or increase the profits to the airline when compared to conventional systems and methods. By allowing ticketed passengers to submit a bid corresponding to the incentive they would accept to be bumped from the oversold flight, the need for the airline to announce a incentive and gradually increase the incentive until a sufficient number of passengers have been bumped is removed. Such a system therefore can reduce or remove the problem of rewarding an identical incentive to all bumped passenger, and instead can provide each passenger the minimum incentive that the passenger is willing to accept.

Bids from ticketed passengers willing to be bumped from a flight, as well as bids from standby passengers seeking to board a flight, can be received by the airline in secret, such that passengers may not be aware of other passenger's bids. Additionally, when an airline announces to the passengers that seats are available for standby bidding, the airline may not announce to the passengers the number of seats standby seats available. Similarly, when an airline announces that a flight is oversold, the airline may not announce to the number of passengers that need to be bumped from the flight. By not announcing the number of seats in these situations, passengers may be more likely to submit an accurate bid, rather than hoping to "game" the system. For example, if a passenger seeking to fly standby knows that the desired flight has a relatively large number of seats available, the passenger may submit a bid lower than what the passenger is truly willing to pay, hoping that the passenger would nonetheless be able to secure one of the available seats. Similarly, if a passenger on an oversold flight knows that the airline needs to bump a relatively large number of passengers from the flight, the passenger may submit a bid higher than what the passenger is truly willing to accept. If the same passenger did not know the number of seats available, the passenger may be more inclined to submit the true bid, to improve the chances of obtaining a seat.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

The invention enables airlines or other transportation providers to receive bids from ticketed or standby passengers, and to use those bids to determine which passengers to board on an oversold or undersold flight (or other similar transportation vehicles). A method and system for receiving bids from passengers and determining which passengers to board a flight will now be described with reference to FIGS. 1-6, which depict representative or illustrative embodiments of the invention.

Figure 1:
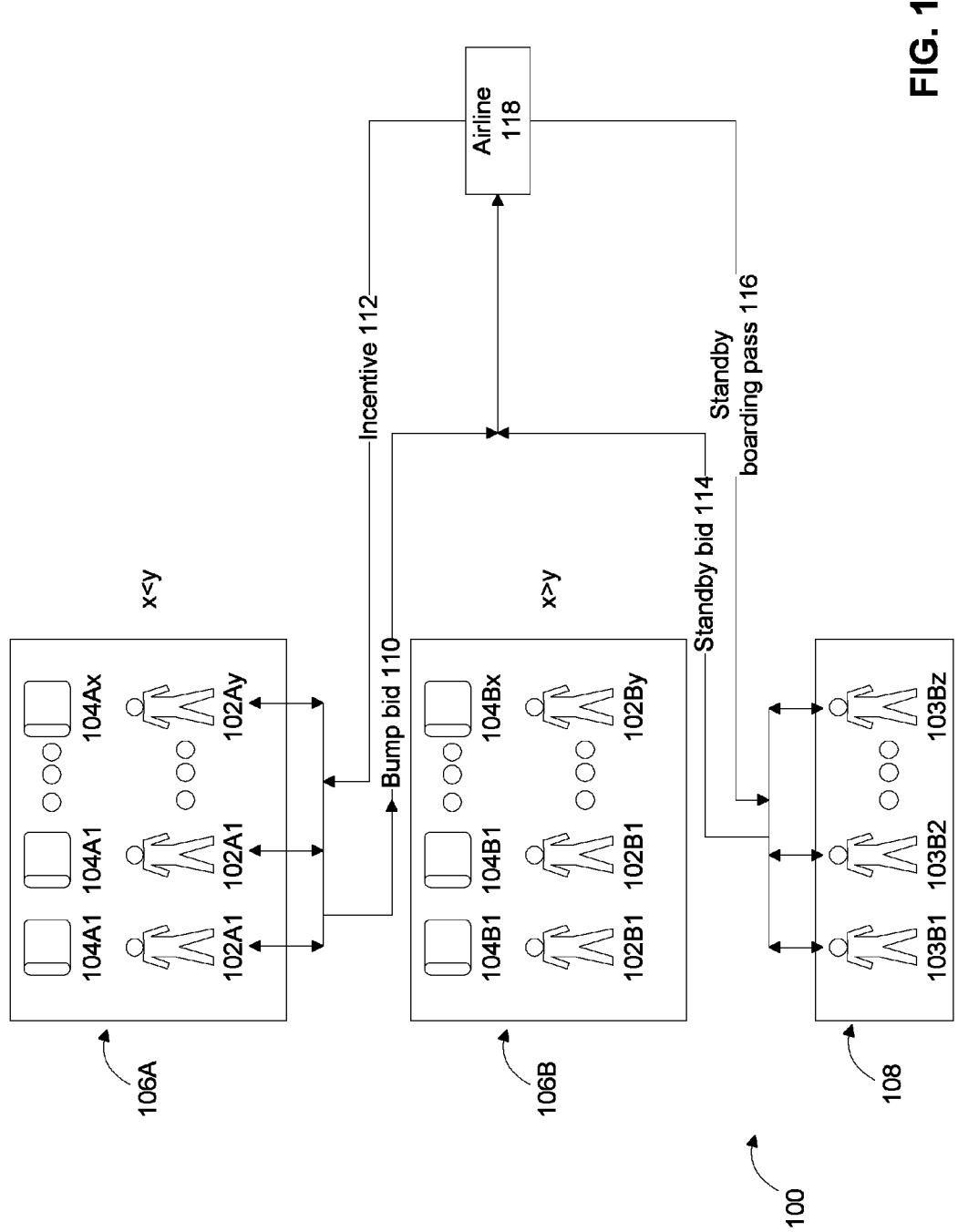
FIG. 1 is a block diagram depicting a system for receiving bids from passengers seeking to fly standby on an undersold flight and from passengers willing to be bumped from an oversold flight, according to an exemplary embodiment of the invention.

FIG. 1 is a diagram depicting components of a system 100 for receiving bids from passengers 102, 103B according to an exemplary embodiment of the invention. The exemplary system 100 depicted in FIG. 1 includes an airline 118 with two exemplary flights: an oversold flight 106A and an undersold flight 106B. Each flight 106A, 106B includes a number of total seats 104A, 104B, and a number of passengers 102A, 102B with a confirmed seat or checked in for the flights 106A, 106B. In the oversold flight 106A, the number of passengers 102A exceeds the number of seats 104A on the flight 106A. In the undersold flight 106B, the number of seats 104B exceeds the number of passengers 102B. FIG. 1 additionally depicts a standby list 108 including standby passengers 103B desiring to board the undersold flight 106B.

The exemplary system 100 further depicts communication of a bump bid 110 from passengers 102A on the oversold flight 106A to the airline 118, and communication of a standby bid 114 from the passengers 103B on the standby list 108 to the airline 118. FIG. 1 further depicts incentives 112 being provided to certain passengers 102A on the first flight 106A and standby boarding passes 116 being provided to certain passengers 103B on the standby list 108 for the second flight 106B. In accordance with exemplary embodiments, a portion of the passengers 102A on the oversold flight 106A may be bumped from the flight 106A, and a portion of the passengers 103B on the standby list 108 may be allowed to board the undersold flight 106B. The airline 118 can determine which passengers 102A to bump and which standby passengers 103B to board based on bump bids 110 and standby bids 114, respectively, received from the passengers 102A, 103B. The elements depicted in FIG. 1 will be discussed in more detail with reference to the methods illustrated in FIGS. 2-6.

Figure 2:
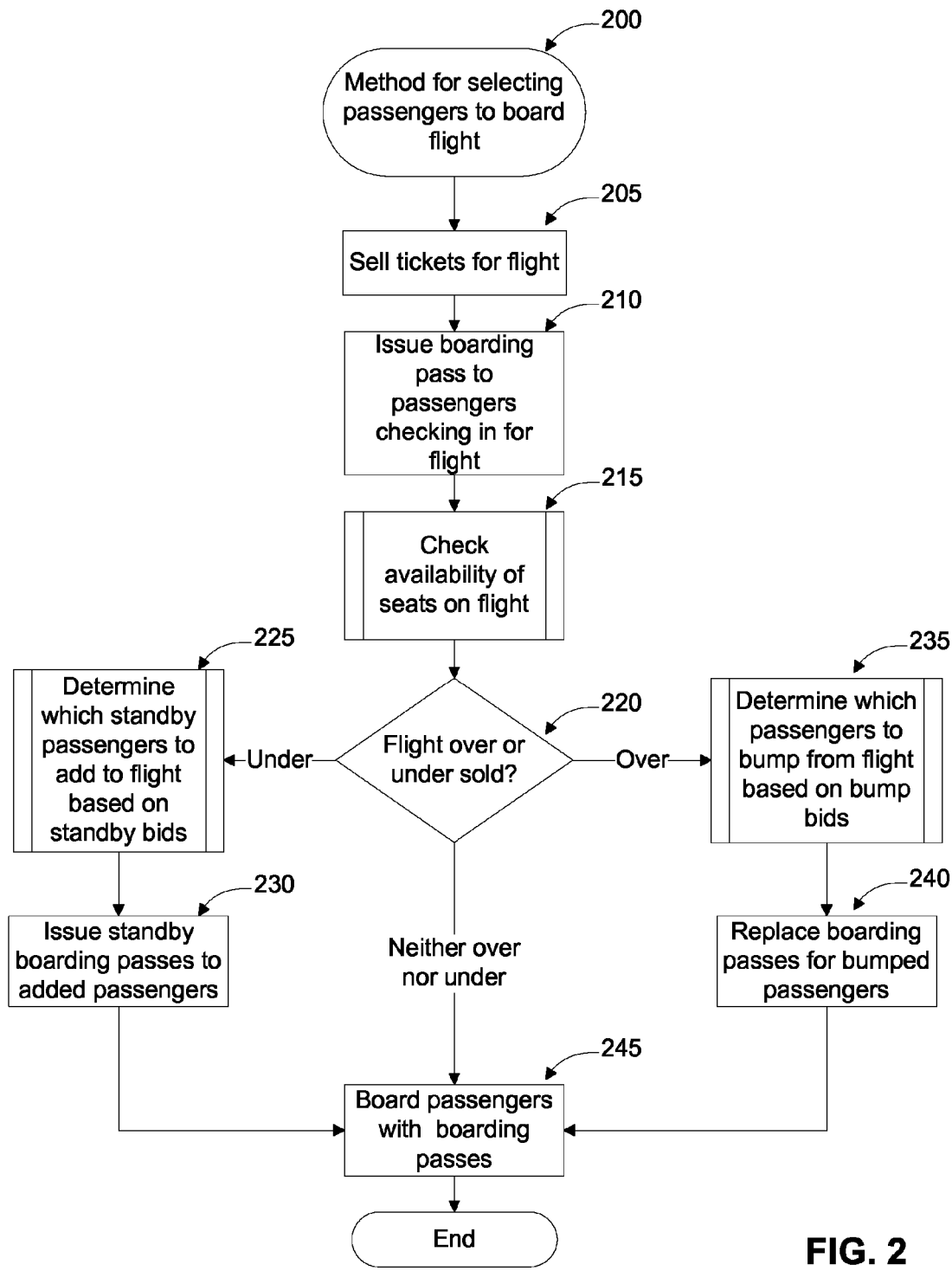
FIG. 2 is a flow chart depicting a method for selecting passengers to board a flight, according to an exemplary embodiment of the invention.

FIG. 2 is a flow chart depicting a method 200 for selecting passengers 102, 103B to board a flight 106, according to an exemplary embodiment of the invention. In step 205, the airline 118 sells tickets to the flight 106. The airline 118 can sell tickets to the flight 106 according to various exemplary methods known to one of ordinary skill in the art having the benefit of the present disclosure. For example, the airline 118 can sell tickets to the flight 106 via the Internet, such as through the airline's 118 website. Alternatively, or additionally, the airline 118 can sell tickets to the flight 106 at kiosks, over the phone, in or near an airport, or at a physical office of the airline 118.

Regardless of the particular method for selling tickets, the tickets sold by the airline 118 can be electronic or physical. Additionally, the airline 118 can sell tickets to the flight 106 according to different fares or fare classes. For example, the airline 118 can sell both refundable and non-refundable tickets to the flight 106, with refundable tickets being more expensive. Additionally, the fare class of the ticket, and therefore the price of the ticket, may vary based on the time the ticket is purchased. For example, tickets may get more expensive as the date of the flight 106 approaches.

In step 210, the airline 118 issues boarding passes to passengers 102 checking in for the flight 106. These passengers 102 can be those passengers 102 who purchased tickets to the flight 106 in step 205. In various exemplary embodiments, the passengers 102 can check in for the flight 106 according to a variety of methods. These methods can include checking in on the airline's 118 website, at a kiosk at the airport, or with an airline 118 employee at a ticket counter.

In step 215, the airline 118 checks the availability of seats 104 on the flight 106. Checking the availability of seats 104 can include a comparison of the number of total seats 104 on the flight 106 and the number of passengers 102 who have checked in for the flight 106. Step 215 will be described in more detail with reference to FIG. 3.

In step 220, the airline 118 determines whether the flight 106 is oversold or undersold. In an exemplary embodiment, this determination can be based upon the availability of seats 104 determined in step 215. Thus, if the airline 118 determines that the flight 106B is undersold (i.e., that the number of passengers 102 checked in is less than the number of seats 104 on the flight 106B), the method 200 branches to step 225, where the airline 118 determines which standby passengers 103B to add to the flight 106B based on standby bids 114. However, if the airline 118 determines that the flight 106A is oversold, the method 200 branches to step 235, where the airline 118 determines which ticketed passengers 102A to bump from the flight 106A based on bump bids 110. FIG. 1 depicts an oversold flight 106A and an undersold flight 106B. If the airline 118 determines that the flight 106 is neither oversold nor undersold (i.e., that the number of passengers 102 checked in is equal to the number of seats 104 on the flight 106), then the method 200 branches to step 245, where the airline 118 boards passengers 102 with boarding passes.

In step 225, the airline 118 determines which standby passengers 103B to add to the flight 106B based on standby bids 114. In an exemplary embodiment, this determination can include receiving standby bids 114 from standby passengers 103B, and determining which standby passengers 103B to add to the flight 106B based on those standby bids 114. In an exemplary embodiment, as shown in FIG. 1, the airline 118 can maintain a standby list 108 of passengers 103B seeking to fly standby on the flight 106B.

In one embodiment, all available seats 104B can be assigned to standby passengers 103B based at least in part upon the standby bids 114. In an alternative embodiment, a portion of available seats 104B can be assigned to standby passengers 103B at least in part upon the standby bids 114, and the remainder of the available seats 104B can be assigned to standby passengers 103B by other methods, such as conventional methods or other methods known to one of ordinary skill in the art having the benefit of the present disclosure. Step 225 will be described in more detail with reference to FIG. 4.

In step 230, the airline 118 issues standby boarding passes 116 to the standby passengers 103B added to the flight 106B in step 225. In an exemplary embodiment, the standby boarding passes 116 issued to standby passengers 103B in step 230 can be equivalent to the boarding passes issued to ticketed passengers 102 in step 210, and therefore can entitle the standby passengers 103B with standby boarding passes 116 to a confirmed seat on the flight 106B. The method 200 then proceeds to step 245, where the airline 118 boards all passengers 102 with boarding passes, including those standby passengers 103B with standby boarding passes 116.

In step 235, the airline 118 determines which ticketed passengers 102A to bump from the flight 106A based on bump bids 110. In an exemplary embodiment, this determination can include receiving bump bids 110 from ticketed passengers 102A, and determining which ticketed passengers 102A to bump from the flight 106A based on those bump bids 110. In one embodiment, as described previously with respect to step 225, all bumped passengers 102A can be selected by the airline 118 based at least in part upon the bump bids 110. In an alternative embodiment, a portion of the bumped passengers 102A can be selected at least in part upon the bump bids 110, and the remainder of the bumped passengers 102A can be selected by other methods, such as conventional methods or other methods known to one of ordinary skill in the art having the benefit of the present disclosure. Step 235 will be described in more detail with reference to FIG. 6.

In step 240, the airline 118 replaces the boarding passes for the passengers 102A that the airline 118 determines to bump in step 235. In an exemplary embodiment, replacing the boarding passes can include taking the boarding pass from the bumped passenger 102A, and issuing a new boarding pass for a different flight 106 to the passenger 102A. The replacement boarding pass can be for a later flight 106 that was selected by the passenger 102A when the passenger 102A submitted its bump bid 110.

In step 245, the airline 118 boards all passengers 102, 103B with boarding passes for the flight 106. In an exemplary embodiment, where the flight 106A was oversold, the passengers 102 boarded on the flight 106A can include all passengers 102A who checked in for the flight 106A in step 210 whom the airline 118 did not bump from the flight 106A in step 235. In another exemplary embodiment, where the flight 106B was undersold, the passengers 102 boarded on the flight 106B can include all passengers 102B who checked in for the flight 106B in step 210, as well as those standby passengers 103B who obtained standby boarding passes 116 in step 230. After the passengers 102, 103B are boarded in step 245, the method 200 ends.

Figure 3:
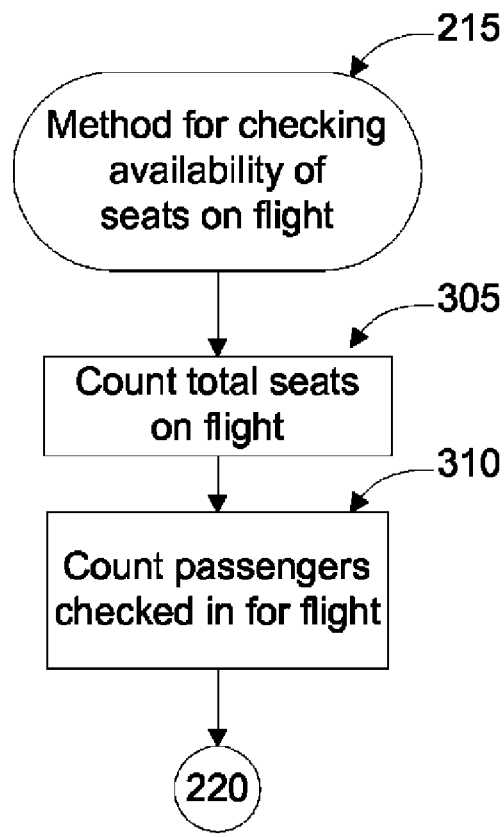
FIG. 3 is a flow chart depicting a method for checking the availability of seats on a flight, according to an exemplary embodiment of the invention.

FIG. 3 is a flow chart depicting a method 215 for checking the availability of seats 104 on a flight 106, according to an exemplary embodiment of the invention. In step 305, the total number of seats 104 on the flight 106 are counted. In one embodiment, the total number of seats 104 can be broken down by various sections. For example, the airline 118 can count the total number of first class, business class, and coach class seats 104 separately. In another embodiment, the airline 118 may store data for its airplane flights 106 that track the total number of seats 104 on a given flight 106. Thus, instead of explicitly counting the total seats 104, the total number of seats 104—whether or not broken down by class—can be retrieved from stored data.

In step 310, the number of passengers 102 that have checked in for a flight 106 are counted. In exemplary embodiments, the airline 118 can count the number of passengers 102 that have checked in for the flight 106 at various different times. For example, the airline 118 can count the number of checked-in passengers 102 a fixed amount of time before the flight 106 is scheduled to depart. In an exemplary embodiment, the airline 118 can count the number of checked-in passengers 102 multiple times, or alternatively, the airline 118 can use a server, computer, or other information processing unit to count the number of checked-in passengers 102 continuously. Additionally, as with counting the total number of seats 104 in step 305, the airline 118 count the number of checked-in passengers 102 separately by seat class. The method 215 then returns to step 220, as described previously with reference to FIG. 1.

Figure 4:
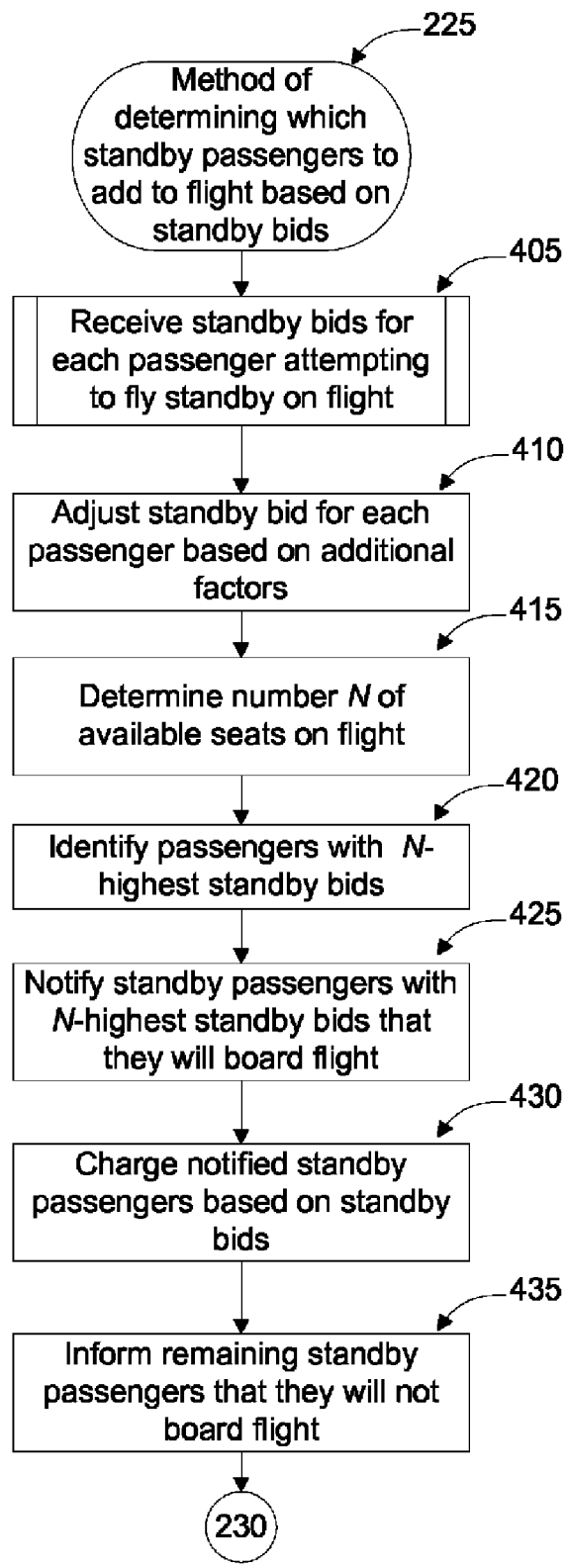
FIG. 4 is a flow chart depicting a method for determining which standby passengers to add to a flight based on standby bids, according to an exemplary embodiment of the invention.

FIG. 4 is a flow chart depicting a method 225 for determining which standby passengers 103B to add to a flight 106B based on standby bids 114, according to an exemplary embodiment of the invention. In step 405, the airline 118 receives the standby bids 114 for each passenger 103B attempting to fly standby on the flight 106B. In an alternative embodiment, as described previously, the airline 118 may receive standby bids 114 from only a portion of those passengers 103B attempting to fly standby on the flight 106B, as the airline 118 may only seat a portion of the standby passengers 103B according to a standby bid 114, and use other methods for determining which other passengers (not shown) to seat.

The set of passengers 103B that are seeking to fly standby on a given flight 106B can be determined by a variety of methods. Regardless of the method or methods used to determine the passengers 103B seeking to fly standby, the identity of the passengers 103B can be maintained on a standby list 108. The standby list 108 can be stored in a database that also stores a corresponding standby bid 114 for each passenger 103B on the standby list 108.

In certain embodiments, some standby passengers 103B may be traveling in groups, such as a family. In such cases, the group of passengers 103B may submit the same bid for each passenger 103B in the group. Alternatively, the group may submit one bid for the entire group of passengers 103B, in which case the airline 118, after receiving the bid, can divide the bid by the number of passengers 103B in the group so that the airline 118 can compare the bid to other bids received from individual passengers 103B. Additionally, a group of passengers 103B can indicate whether the group would be willing to travel even if they could not be seated together on the flight 106B. Step 405 will be described in more detail with reference to FIG. 5.

In step 410, the standby bid 114 received by each passenger 103B can be adjusted based on additional factors. In exemplary embodiments, a variety of additional factors can be used to adjust the standby bid 114 received by each passenger 103B in step 405. In one embodiment, the airline 118 can adjust a standby bid 114 entered by a passenger 103B based on the fare class of the passenger's 103B ticket. For example, if a passenger 103B purchased a full fare ticket rather than a discounted ticket, the passenger's 103B standby bid 114 may be increased by a certain percentage (e.g., 10%) or amount (e.g., $50). The increase in the bid need not affect the actual amount the passenger 103B would pay for the standby seat 104B if the passenger's 103B bid is eventually accepted. Rather, the increase in the bid can be an adjustment made by the airline 118 to provide a benefit to passengers 103B who pay for full fare tickets instead of discounted tickets.

Another factor that can be used to adjust a passenger's 103B bid is the frequent flier status of the passenger 103B. Many airlines 118 offer frequent flier programs to reward those passengers 102, 103B who repeatedly travel with the airline 118 or its partners. Some airlines 118 further provide different tiers of frequent flier status, such as providing a first level for occasional travelers, a second level for those traveling at an intermediate frequency, and a third level for those that travel very regularly. Thus, in one embodiment, an airline 118 can adjust a passenger's 103B bid based on the passenger's 103B status at a frequent flier, and the particular level of frequent flier status. For example, the bid of an occasional traveler who participates in an airline's 118 frequent flier program can be increased by a certain small percentage (e.g., 5%), while bids of intermediate and very regular travelers can be increased by greater percentages (e.g., 15% and 25%, respectively).

In another embodiment, the airline 118 can offer passengers 103B an option to pay a fee in advance in exchange for increasing their standby bid 114 by a given percentage, should the passenger 103B later attempt to fly standby. For example, an airline's 118 website that allows passengers 103B to purchase tickets on-line can include such an option during the purchasing process for passengers 103B. The same or similar options can be offered to a passenger 103B during the purchasing process—or at a different time—regardless of the purchasing method (e.g., kiosks, in-person, over the telephone) used. In a particular embodiment, an airline 118 can offer the passenger 103B the option to pay a variety of fees in exchange for increasing their standby bid 114 by a corresponding variety of amounts in the event the passenger 103B eventually seeks to exchange the seat 104 on the ticketed flight 106 to fly standby on a different flight 106B. For example, the airline 118 can offer the passenger 103B the option of paying an extra $10.00, $25.00, or $50.00 in return for increasing the passenger's 103B bid by 10%, 25%, or 50% respectively, in the event the passenger 103B submits a standby bid 114 for one or more flights 106B.

In another embodiment, the airline 118 can offer the passenger 103B the option to pay a one-time or recurring fee to increase all standby bids 114 the passenger 103B submits over a given time period. For example, the airline 118 can offer passengers 103B the option to pay a $100 fee in exchange for increasing the passenger's 103B standby fee by a fixed percentage for a one-year period.

In yet another embodiment, an airline 118 can adjust the standby bid 114 of a passenger 103B if the passenger 103B is seeking to fly standby on a flight 106B because the flight 106 for which the passenger 103B was ticketed was canceled by the airline 118, or if the passenger 103B missed the ticketed flight 106 due to a late connecting flight 106. Additionally, an airline 118 can adjust the standby bid 114 based on how long the passenger 103B has been attempting to board a standby flight 106B, whether in terms of the amount of time or in terms of the number of flights 106B on which the passenger 103B has attempted to fly standby.

In various other embodiments, a variety of behaviors that the airline 118 seeks to encourage can lead to an increase in a passenger's 103B bid. For example, an airline 118 can increase a standby bid 114 for a passenger 103B who purchased a ticket far in advance of the flight 106. Similarly, an airline 118 can increase a standby bid 114 for a passenger 103B who does not have check-in baggage, or alternatively, carry-on baggage. Other additional factors that can be used to adjust a standby bid 114, including those based on behaviors that the airline 118 may want to encourage, can be determined by one of ordinary skill in the art having the benefit of the present disclosure.

Additionally, although each of the foregoing examples for adjusting a standby bid 114 relate to increasing the bid, decreasing a bid under reverse circumstances (e.g., decreasing a bid for purchasing a discounted ticket) is also possible. However, given that the standby bids 114 may be adjusted only internally to help the airline 118 organize the list 108 of standby passengers 103B, rather than the actual standby bids 114 that the standby passengers 103B would pay being affected, decreasing the bids instead of increasing them may not have any practical effect.

Moreover, the airline 118 can determine whether or not to indicate to the passenger 103B the "adjusted" value of the passenger's 103B standby bid 114. In one embodiment, the airline 118 may determine that providing the adjusted value of the standby bid 114 to the passenger 103B can allow passengers 103B to submit a well informed bid, and therefore choose to provide this information. Alternatively, the airline 118 may believe that providing the adjusted value of the standby bid 114 to the passenger 103B may prevent the passenger 103B from entering the maximum value that the passenger 103B would be willing to pay, and therefore decline to provide this information.

In step 415, a number N corresponding to the number of available seats 104B on the flight 106B is determined. This can be accomplished by subtracting the number of checked-in passengers 102 from the total number of seats 104 on the flight 106B. In an exemplary embodiment, different flight classes (e.g., first, business, and coach) can have a separate corresponding number N, and as such, the bidding process and seating process for standby passengers 103B can be performed separately by flight class.

In step 420, the N-highest standby bids 114 are identified. In an exemplary embodiment, the N-highest bids can be identified based on the values for the bids as adjusted in step 410. Identifying the N-highest bids can include sorting all bids received by the airline 118 in descending order, selecting the highest bid, and then continuing to select each next highest bid until N bids have been selected.

In an exemplary embodiment, the airline 118 can take into account groups traveling standby together in identifying the N-highest bids. For example, if there are five available seats 104B (i.e., N=5), and the two highest bidders have been identified so only three seats 104B are available, a family of four passengers 103B each having the next highest bid may not be identified as the next highest bidders, since there are not sufficient seats for all members of the family. Then, an individual passenger 103B (or smaller group of passengers 103B) with the next highest bid after the family's bid can be identified. In an alternative embodiment, a family or other group in such a position can indicate whether a subset of the family or group is willing to board the flight 106B.

In step 425, the standby passengers 103B with the N-highest bids (i.e., those passengers 103B identified in step 420) are notified that they may board the flight 106B. In exemplary embodiments, these passengers 103B can be informed via an audio and/or video announcement that they have been selected to board the flight 106B.

In step 430, the standby passengers 103B notified in step 425 are charged an amount equal to their standby bid 114. As described previously, the amount charged may not be the adjusted standby bid 114 determined in step 410, but rather the standby bid 114 received by the airline 118 in step 405. In an exemplary embodiment, the notified passengers 103B can provide a credit card or other form of payment to the airline 118 to pay for their standby bids 114 after they are notified of their selection. In an alternative embodiment, passengers 103B can provide a credit card or other form of payment to the airline 118 when they submit their standby bids 114, and then the airline 118 can charge the credit card only if and when their standby bids 114 are selected. In yet another embodiment, the airline 118 can charge a credit card that the passenger 103B originally used to purchase the ticket for the flight 106B to pay for the standby bid 114.

In step 435, the airline 118 notifies the remaining standby passengers 103B (i.e., those that were not notified in step 425) that they will not board the flight 106B. These passengers 103B may not be charged by the airline 118. In one embodiment, these passengers 103B can be automatically transferred to the standby list 108 for the next flight 106 to the same destination. In a particular embodiment, the standby bids 114 for each of these passengers 103B that were received by the airline 118 in step 405 also can be transferred to the next flight's 106 standby list 108. In an alternative embodiment, these passengers 103B can be given the opportunity to enter a new standby bid 114 for the new flight 106B. After step 435, the method 225 proceeds to step 230, as referenced in FIG. 2.

Figure 5:
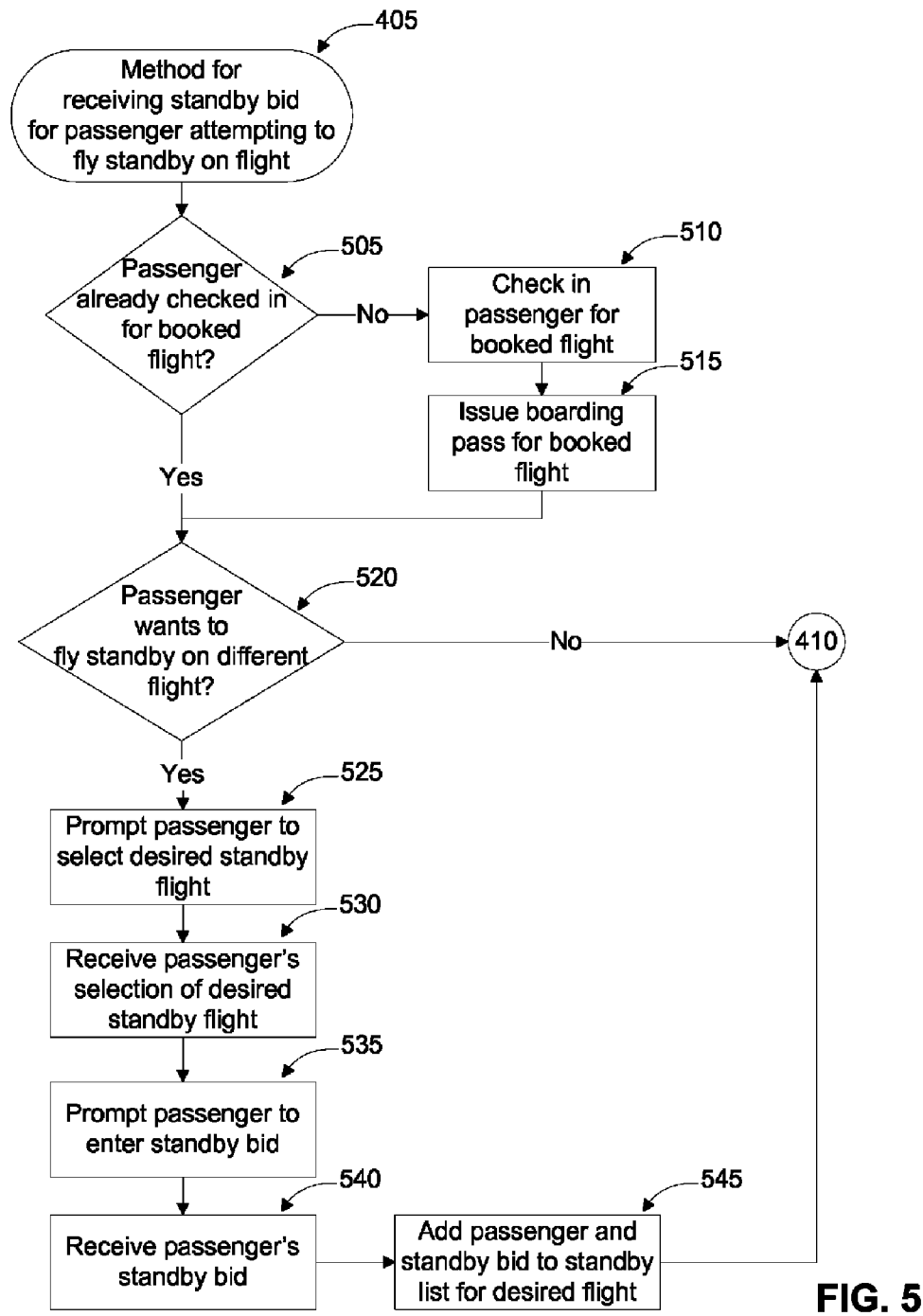
FIG. 5 is a flow chart depicting a method for receiving a standby bid for a passenger seeking to fly standby on a flight, according to an exemplary embodiment of the invention.

FIG. 5 is a flow chart depicting a method 405 for receiving a standby bid 114 for a passenger 103B seeking to fly standby on a flight 106B, according to an exemplary embodiment of the invention. In step 505, the method 405 determines whether the passenger 103B has already checked in for the passenger's 103B booked flight 106. The booked flight 106 can refer any flight 106 for which the passenger 103B has a confirmed seat 104, ticket, or boarding pass. If the passenger 103B has already checked in, the method 405 branches to step 510. If the passenger 103B has not already checked in, then the method 405 branches to step 520. In an alternative embodiment, the passenger 103B seeking to fly standby on a flight 106B may not already have a confirmed seat 104, ticket, or boarding pass for a given flight 106. For example, an airline 118 can have a policy or promotion that allows certain passengers 103B to fly standby without having a confirmed seat 104. In such an embodiment, the method 405 can proceed directly to step 525, where the passenger 103B is prompted to select the desired standby flight 106B.

In step 510, the passenger 103B is checked in for the booked flight 106. Various methods exist for checking in a passenger 103B for a flight 106. Passengers 103B can be checked in, for example, via the airline's 118 website, via a kiosk, or in person at a ticket counter. Other suitable methods of checking in passengers 103B can be used as well.

In step 515, a boarding pass is issued to the passenger 103B. The boarding pass can correspond to the flight 106 for which the passenger 103B checked in during step 510. In an exemplary embodiment, once a boarding pass is issued to a passenger 103B in step 515, the airline 118 can update its count of checked-in passengers 103B and available seats 104 as described previously with reference to step 215. The method 405 then proceeds to step 520.

In step 520, the method 405 determines whether a passenger 103B wants to fly standby on a different flight 106B (i.e., a flight 106B other than the one for which the passenger 103B has checked in). If the passenger 103B wants to fly standby on a different flight 106B, the method 405 branches to step 525. Otherwise, the method 405 proceeds to step 410, as referenced in FIG. 4.

In various embodiments, the passenger 103B can indicate a desire to fly standby on a different flight 106B in a variety of ways. For example, the passenger 103B can use the airline's 118 website to indicate a desire to fly standby on another flight 106B. Alternatively, the passenger 103B can use a kiosk at the airport, or indicate to an airline 118 employee—whether at a ticket counter, or to an employee at the departure gate for the desired standby flight 106B—that the passenger 103B would like to be added to a standby list 108 for a different flight 106B.

In an alternative embodiment, the airline 118 can determine whether a passenger 103B wants to fly standby before the passenger 103B has checked in for a flight 106, or during the check-in process. For example, in one embodiment, a passenger 103B can check in for a flight 106 using the airline's 118 website or an airline 118 kiosk, and during the check-in process, the passenger 103B can be prompted to indicate whether the passenger 103B wants to be added to the standby list 108 for a given flight 106B.

In step 525, the passenger 103B is prompted to select the desired standby flight 106B. In one embodiment, the passenger 103B can be prompted to enter this selection immediately after indicating a desire to fly standby. Additionally, to facilitate the passenger's 103B entry of this selection, the airline 118 can provide to the passenger 103B a list of flights 106 to the passenger's 103B desired destination. Such a list can include only those flights 106B where there is at least one seat 104B available. Then, in step 530, the passenger's 103B selection of the desired standby flight 106B is received by the airline 118.

In step 535, the passenger 103B is prompted to enter a standby bid 114. The standby bid 114 can represent the maximum amount that the passenger 103B is willing to pay to be able to fly on the desired flight 106B. In one embodiment, the passenger 103B can be prompted to enter this selection immediately after selecting the desired standby flight 106B in step 525. Then, in step 540, the passenger's 103B entry of the standby bid 114 is received by the airline 118.

The steps 520 through 535 can be performed in a variety of ways and by utilizing a variety of interfaces. Additionally, the steps can be performed at a variety of times—such as during the check-in process, or after the check-in process. For example, in some embodiments, where the passenger 103B checks in for a ticketed flight 106 using the airline's 118 website or kiosk, the airline 118 can perform steps 520 through 535 using the website or kiosk.

Alternatively, where the airline 118 performs steps 520 through 535 after the check-in process, the airline 118 can provide a separate website interface or kiosk for interfacing with the passenger 103B. An exemplary kiosk can be located at or near the departure gate for each flight 106. Additionally, an exemplary website interface for interacting with a passenger 103B in performing steps 520 through 535 can be specially configured for mobile or handheld Internet devices. Thus, passengers 103B who have already checked in for a flight 106, and may be seated in an airport terminal near the departure gate for another flight 106B on which they may desire to fly standby can use a mobile Internet device to access the airline's 118 website, which can receive a passenger's 103B indication of a desire to fly standby on a particular flight 106B, as well as the passenger's 103B standby bid 114 for the flight 106B.

In another embodiment, the airline 118 can provide an interface with a passenger 103B for performing steps 520 through 535 via electronic mail, text messaging, or other similar messaging interface. For example, a passenger 103B can send an email or text message to a specific address that includes information that can allow the airline 118 to perform steps 520 through 535. In an exemplary embodiment, a passenger 103B can send an email or text message to an address provided by the airline 118 that indicates the desired flight 106B and the passenger's 103B standby bid 114 for the flight 106B. In one embodiment, the message also can include an identification of the passenger 103B, such as the passenger's 103B ticket number or confirmation number. Alternatively, the identification of the passenger 103B can include the telephone number or email address from which the passenger 103B sent the message. If the passenger 103B is part of a family or group, as described previously, the passenger's 103B message can include an identification of the other passengers 103B within the group, as well as an indication of whether the group is willing to fly without sitting next to each other. Other interfaces for interacting with a passenger 103B in performing steps 520 through 535, such as an automated telephone system, may be recognized by one of ordinary skill in the art and can be utilized as appropriate. Additionally, an airline 118 can utilize a combination of two or more of the foregoing interfaces to perform steps 520 through 535.

Regardless of the interfaces used by the airline 118 to perform steps 520 through 535, the airline 118 can choose the amount of information regarding the standby list 108 to share with passengers 103B seeking to fly standby on a given flight 106B. For example, the airline 118 can announce the number of available seats 104B on a flight 106B to passengers 103B within proximity of the flight's 106B departure gate. For flights 106B on which only a few seats 104B are available, providing such information may encourage passengers 103B to enter a high bid to improve their chances of securing a seat 104B on the flight 106B. Alternatively, especially in cases where there may be many available seats 104B on a fight, the airline 118 may not share the number of available seats 104B with potential passengers 103B, because such information may encourage passengers 103B to enter a lower standby bid 114 than they would truly be willing to spend to board the flight 106B.

Additionally, the airline 118 can choose to keep all passengers' 103B bids hidden from other passengers 103B. Not sharing this information also can encourage passengers 103B to enter a standby bid 114 equal to the maximum amount they are willing to spend, rather than entering a standby bid 114 minimally above another passenger's 103B standby bid 114. Alternatively, if the airline 118 believes that sharing passengers' 103B bids with other passengers 103B may increase competitive bidding between passengers 103B, thereby driving standby bids 114 upward, the airline 118 can display (or otherwise provide to passengers 103B) a list of the top passengers' 103B standby bids 114 to other passengers 103B.

Moreover, the airline 118 also can choose whether to allow passengers 103B to submit only one standby bid 114, or instead, to allow passengers 103B to edit or adjust the standby bid 114, or to submit a subsequent standby bid 114. In one embodiment, the airline 118 can permit passengers 103B only to submit one standby bid 114 per flight 106B. This can encourage passengers 103B to submit their true, maximum standby bid 114, rather than to attempt to enter a lower bid with hopes of increasing the standby bid 114 should the passenger 103B later receive more information (such as learning that the flight 106B is nearly full) that suggests it may be difficult to receive a seat 104B on the flight 106B with a low standby bid 114.

In step 545, the passenger 103B and the passenger's 103B standby bid 114 are added to the standby list 108 for the desired flight 106B. After step 545, the method 405 proceeds to step 410, as referenced in FIG. 4.

Figure 6:
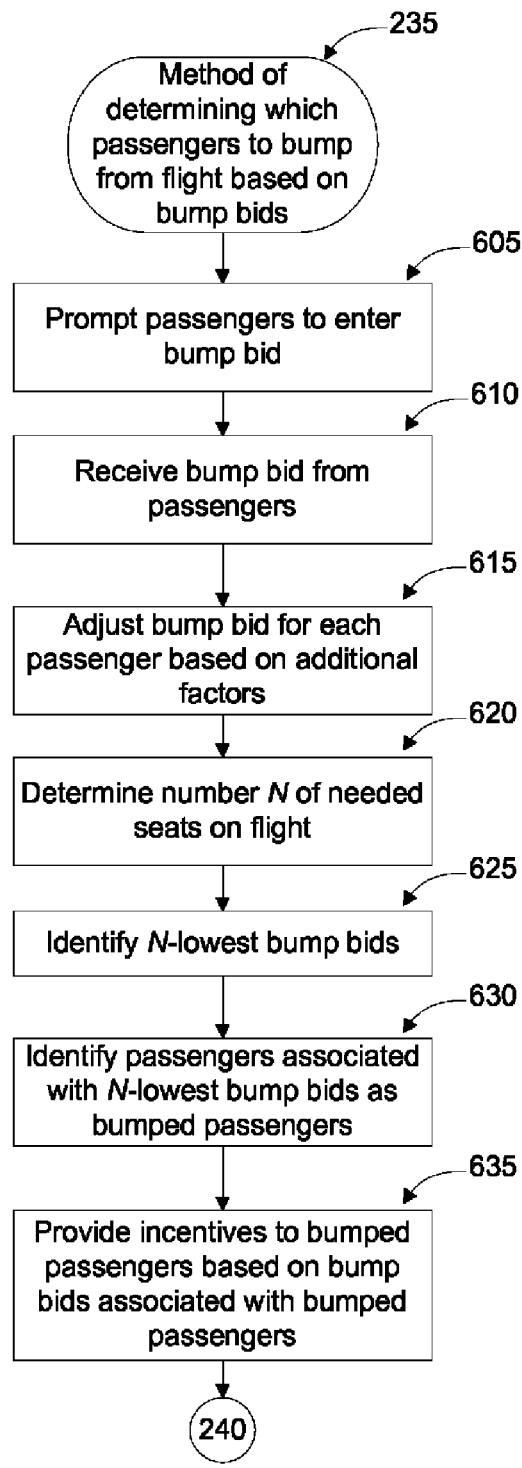
FIG. 6 is a flow chart depicting a method for determining which passengers to bump from a flight based on bump bids, according to an exemplary embodiment of the invention.

FIG. 6 is a flow chart depicting a method 235 for determining which passengers 102A to bump from a flight 106A based on bump bids 110, according to an exemplary embodiment of the invention. In step 605, the passengers 102A are prompted to enter a bump bid 110. In exemplary embodiments, the airline 118 can prompt passengers 102A to enter a bump bid 110 in a variety of ways. In one embodiment, the airline 118 can prompt passengers 102A by announcing (whether via an audio announcement, a video display, or other means) that the flight 106A has been oversold, and that any passengers 102A that have boarding passes or confirmed seats 104A on the flight 106A that are willing to be bumped from the flight 106A and instead board a later replacement flight 106 can submit a bump bid 110.

The bump bid 110 submitted by the passengers 102A can include a desired incentive 112 representing what each passenger 102A would be willing to accept in exchange for being bumped from the flight 106A. In one embodiment, the bump bid 110 can include the amount of money that the passenger 102A would be willing to accept. The amount of money can be in the form of a cash payment or an airline 118 voucher. In another embodiment, the bump bid 110 can include a number of frequent flier miles—or other non-monetary incentives 112—that would be added to the passenger's 102A account in exchange for being bumped from the flight 106A. In yet another embodiment, the bump bid 110 can include an offer to be bumped from the flight 106A in exchange for receiving an upgrade to another flight class (e.g., first class) on the passenger's 102A replacement flight 106.

Moreover, the bump bid 110 submitted by any passenger 102A can include a combination of one or more types of desired incentives 112. An exemplary bump bid 110 thus can include a monetary incentive 112, a request for frequent flier miles, and a request for a class upgrade on a replacement flight 106.

In one embodiment, the bump bids 110 can specify a particular incentive 112, and the bumped passengers 102A can be bumped to a replacement flight 106, such as the next flight 106 to the same destination. In another embodiment, the bump bids 110 can specify, along with the desired incentive 112, the desired replacement flight 106.

In step 610, the bump bids 110 the passengers 102A entered in step 605 are received. In an exemplary embodiment, after receiving the passengers' 102A bump bids 110, the airline 118 can standardize the bump bid 110 values. In other words, the airline 118 can determine the cost associated with providing each incentive 112 requested by the passengers' 102A bump bids 110. For example, the airline 118 can determine that a bump bid 110 that includes a request for 5,000 frequent flier miles can cost $150 to the airline 118, while a bump bid that includes a request for a $175 airline voucher can cost the airline 118 only $140. Similarly, the airline 118 can determine that seating a bumped passenger 102A on a popular replacement flight 106 may cost the airline 118 more than seating a bumped passenger 102A on a less popular flight 106. Thus, the particular replacement flight 106 selected by the passenger 102A also can affect the airline's 118 cost calculation and standardization. In one embodiment, the airline 118 can utilize a computer program or database that estimates or calculates the cost of each bump bid 110 (including the incentive 112 and the replacement flight 106) received from a passenger 102A.

In step 615, each passenger's 102A bump bid 110 is adjusted based on additional factors. As described previously with respect to adjusting standby bids 114 with reference to step 410 of FIG. 4, the airline 118 can use a variety of additional factors to adjust the bump bids 110. In various embodiments, the airline 118 can adjust bump bids 110—such as by decreasing the value of the bump bids 110—based on the fare class of the passenger's 102A ticket, the passenger's 102A frequent flier status, whether the passenger 102A has paid a one-time or recurring fee in return for having the bump bid 110 adjusted, or any other suitable factor. As described previously with reference to adjusting standby bids 114, the adjustment of the bump bids 110 may not affect the amount or type of the incentive 112 that the passenger 102A will actually receive if the passenger's 102A bump bid 110 is accepted. Rather, the adjustment may affect only how the passenger's 102A bump bid 110 is compared to other passenger's 102A bump bids 110.

In step 620, a number N corresponding to the number of needed seats 104A on the flight 106A is determined. This can be accomplished by subtracting the total number of seats 104A on the flight 106A from the number of checked-in passengers 102A.

In step 625, the N-lowest bump bids 110 are identified. In an exemplary embodiment, the N-lowest bump bids 110 can be identified based on the values for the bids as standardized, and then adjusted in step 615. Identifying the N-lowest bids can include sorting all bump bids 110 received by the airline 118 in ascending order, selecting the lowest bid, and then continuing to select each next lowest bid until N bids have been selected. As described previously with reference to standby bids 114, the airline 118 can take into account groups traveling together who submit bump bids 110. For example, if only three seats 104A are needed on a flight 106A, and a four-person family has submitted the lowest bump bid 110, the airline 118 can skip over that family and move to the next lowest bump bids 110. Alternatively, if the airline 118 determines that the four-person family's bid is so much lower than the next lowest bump bid 110 that the airline 118 would lose less revenue by paying the incentives 112 to the four-person family than by bumping three individual passengers 102A, the airline 118 can bump the four-person family and have an empty seat 104A. In a particular embodiment, the airline 118 then can fill the empty seat 104A with a standby passenger 103B, such as the standby passenger 103B with the highest standby bid 114.

In step 630, the passengers 102A with the N-lowest bids (i.e., the passengers 102A with the bump bids 110 identified in step 625) are notified that their bump bids 110 have been accepted and that they have been bumped from the flight 106A. In exemplary embodiments, these passengers 102A can be informed via an audio and/or video announcement that they have been bumped from the flight 106A.

In step 635, the passengers 102A notified in step 630 are provided with incentives 112 based on their bump bids 110. In an exemplary embodiment, the incentives 112 can be provided immediately, such as by crediting a cash reward to a credit card or other electronic account associated with the passenger 102A. If frequent flier miles or airline 118 vouchers are provided as part of the incentive 112, then those incentives 112 can be added to the passenger's frequent flier account with the airline 118.

After step 635, the method 235 returns to step 240.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. For example, although the exemplary methods and steps disclosed herein largely relate to airline 118 flights, the invention can be similarly used with any mode of transportation. Additionally, the invention also can be used in other contexts beyond transportation, where tickets can be oversold or undersold, and where wait list, standby lists, or the like are used to fill remaining seats. Accordingly, such alternative embodiments are included in the invention described herein.

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention.

The invention can be used with computer hardware and software that performs the methods and processing functions described above. Specifically, in describing the functions, methods, and/or steps that the airline 118 can perform in accordance with the invention, the airline 118 can accomplish any or all of these steps by using an automated or computerized process. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for bumping passengers from a transportation vehicle comprising:

receiving, by a computer, a bump bid for each of a plurality of bump passengers having a ticket for the transportation vehicle; and selecting, by a computer, at least one bump passenger to bump from the transportation vehicle based on the bump bid for the at least one bump passenger;

wherein selecting the at least one bump passenger comprises:

identifying, by a computer, a first bump passenger from the plurality of bump passengers;

determining, by a computer, a group size of the first bump passenger, the group size being a number of bump passengers traveling in a group with the first bump passenger, including the first bump passenger;

determining, by a computer, whether the group size of the first bump passenger exceeds a number of still-needed seats on the transportation vehicle; and selecting, by a computer, the first bump passenger and any bump passengers traveling with the first bump passenger to be bumped from the transportation vehicle in response to a determination that the group size does not exceed the number of still-needed seats on the transportation vehicle.

2. The method of claim 1, further comprising providing, by a computer, an incentive to the each of the selected bump passengers, wherein the incentive provided to each of the selected bump passengers is based on the bump bid of each respective selected bump passenger.

3. The method of claim 1, further comprising determining, by a computer, a cost associated with providing an incentive based on each received bump bid to each respective bump passenger.

4. The method of claim 3, wherein selecting the at least one bump passenger to bump from the transportation vehicle based on the bump bid of the at least one bump passenger further comprises selecting the at least one bump passenger to bump from the transportation vehicle based on the cost associated with providing the incentive to the at least one bump passenger.

5. The method of claim 4, wherein the transportation vehicle has a number of total seats and a number of checked-in passengers, and
wherein selecting the at least one bump passenger to bump from the transportation vehicle based on the cost associated with providing the incentive to the at least one bump passenger further comprises:
determining, by a computer, a number of needed seats by subtracting the number of total seats from the number of checked-in passengers; and
iteratively selecting, by a computer, a bump passenger from the plurality of bump passengers to bump from the transportation vehicle according to a selection process until the number of bump passengers selected is equal to or greater than the number of needed seats.

6. The method of claim 5, wherein each iteration of the selection process comprises:
identifying a next bump passenger from the plurality of bump passengers to bump from the transportation vehicle, the next bump passenger being identified in response to a determination that the cost associated with providing the incentive based on the bump bid of the next bump passenger is lower than or equal to the cost associated with providing the incentive based on the bump bid of each other bump passenger in the plurality of bump passengers that have not already been selected to be bumped from the transportation vehicle;
identifying all bump passengers in the plurality of bump passengers traveling in a next group with the next bump passenger;
determining a next group size of the next group, the next group size being the number of passengers traveling in the next group;
calculating the number of still-needed seats by subtracting the number of bump passengers already selected to be bumped from the transportation vehicle from the number of needed seats; and
selecting the next bump passenger and any bump passengers traveling in the next group with the next bump passenger from the plurality of bump passengers to be bumped from the transportation vehicle in response to a determination that the next group size is less than or equal to the number of still-needed seats;
removing the next bump passenger and any bump passengers traveling in the next group from the plurality of bump passengers.

7. The method of claim 5, wherein each iteration of the selection process comprises:
identifying a next bump passenger from the plurality of bump passengers to bump from the transportation vehicle, the next bump passenger being identified in response to a determination that the cost associated with providing the incentive based on the bump bid of the next bump passenger is lower than or equal to the cost associated with providing the incentive based on the bump bid of each other bump passenger in the plurality of bump passengers that have not already been selected to be bumped from the transportation vehicle;
identifying all bump passengers in the plurality of bump passengers traveling in a next group with the next bump passenger;
determining a next group size of the next group, the next group size being the number of passengers traveling in the next group;
calculating the number of still-needed seats by subtracting the number of bump passengers already selected to be bumped from the transportation vehicle from the number of needed seats;
determining whether to bump the next passenger and any bump passengers traveling in the next group from the plurality of bump passengers; and
removing the next bump passenger and any bump passengers traveling in the next group from the plurality of bump passengers,
wherein determining whether to bump the next passenger and any bump passengers traveling in the next group from the plurality of bump passengers comprises:
if the next group size is less than or equal to the number of still-needed seats, selecting the next passenger and any bump passengers traveling in the next group to be bumped from the transportation vehicle; and
if the next group size exceeds the number of still-needed seats, comparing a first cost of bumping the next group from the transportation vehicle with a second cost of bumping a number of other bump passengers from the transportation vehicle, the number of other bump passengers being equal to the number of still-needed seats, and if the second cost exceeds the first cost, selecting the next passenger and any bump passengers traveling in the next group to be bumped from the transportation vehicle.

8. The method of claim 7, wherein in at least one iteration of the selection process, the group size exceeds the number of still-needed seats.

9. The method of claim 1, wherein receiving, by a computer, a bump bid for each of a plurality of bump passengers having a ticket for the transportation vehicle comprises:
determining, by a computer, whether at least one bump passenger in the plurality of bump passengers is traveling in a group with at least one other bump passenger;
associating, by a computer, the bump bid of the at least one bump passenger with any bump passengers traveling in a group with the at least one the at least one other bump passenger.

10. The method of claim 1, wherein at least one bump bid comprises one or more of: a request for credits to a frequent traveler account, a request for an upgrade to a higher class of travel, and a selection of a confirmed seat for a replacement transportation vehicle.

11. The method of claim 3, further comprising adjusting the bump bids from each of the bump passengers based on additional factors,
wherein the additional factors comprise at least one of: a frequent flier status of the bump passenger, a fare class of the bump passenger, and a transportation class of the bump passenger.

12. The method of claim 11, wherein determining the cost associated with providing an incentive based on each received bump bid to each respective bump passenger comprises determining a cost associated with providing an incentive based on each adjusted bump bid, and
wherein selecting the first bump passenger to bump from the transportation vehicle based on the bump bid of the first bump passenger comprises selecting the first bump passenger to bump from the transportation vehicle based on the cost associated with providing the incentive to the first bump passenger.

13. The method of claim 6, further comprising providing, by a computer, an incentive to the each of the selected bump passengers; and adjusting the bump bids from each of the bump passengers based on additional factors, the additional factors comprising at least one of: a frequent flier status of the bump passenger, a fare class of the bump passenger, and a transportation class of the bump passenger, wherein receiving, by a computer, a bump bid for each of a plurality of bump passengers having a ticket for the transportation vehicle comprises:

determining, by a computer, whether at least one bump passenger in the plurality of bump passengers is traveling in a group with at least one other bump passenger;

associating, by a computer, the bump bid of the at least one bump passenger with any bump passengers traveling in a group with the at least one the at least one other bump passenger;

wherein determining the cost associated with providing an incentive based on each received bump bid to each respective bump passenger comprises determining a cost associated with providing an incentive based on each adjusted bump bid, wherein selecting the at least one bump passenger to bump from the transportation vehicle based on the bump bid of the at least one bump passenger comprises selecting the at least one bump passenger to bump from the transportation vehicle based on the cost associated with providing the incentive to the at least one bump passenger, wherein at least one bump bid is received via one of: an electronic mail message, a text message, a website interface, and a kiosk interface, wherein at least one bump bid comprises one or more of: a request for credits to a frequent traveler account, a request for an upgrade to a higher class of travel, and a selection of a confirmed seat for a replacement transportation vehicle, and wherein the incentive provided to each of the selected bump passengers is based on the unadjusted bump bid of each respective selected bump passengers.

14. The method of claim 1, wherein the number of still-need seats comprises a number of total needed seats minus a number of bump passengers already selected to be bumped from the transportation vehicle.

15. A non-transitory computer-readable medium having computer-readable program code embodied therein for selecting bump passengers to be bumped from a transportation vehicle, the computer-readable program code comprising:

computer-readable program code for receiving a bump bid for a plurality of bump passengers having a ticket to board the transportation vehicle;

computer-readable program code for sorting the plurality of bump passengers having a ticket to board the transportation vehicle based on the bump bid for each bump passenger in the plurality of bump passengers, thereby creating a sorted plurality of bump passengers; and computer-readable program code for selecting which bump passengers having a ticket to bump from the transportation vehicle based on the sorted plurality of bump passengers, wherein the transportation vehicle has a number of needed seats, the number of needed seats being a number of total seats subtracted from a number of checked-in passengers, wherein the number of needed seats and the bump bids for bump passengers other than each respective bump passenger are inaccessible to each respective bump passenger when each respective bump bid is received for each respective bump passenger, wherein the computer-readable program code for receiving a bump bid for a plurality of bump passengers having a ticket to board the transportation vehicle comprises:

computer-readable program code for receiving a bump bid from a given bump passenger having a ticket to board the transportation vehicle;

wherein the sorted plurality of bump passengers has a first bump passenger, and wherein the computer-readable program code for selecting which bump passengers having a ticket to board to the transportation vehicle based on the sorted plurality of bump passengers comprises:

computer-readable program code for determining a number of still-needed seats on the transportation vehicle, by subtracting a number of bump passengers already selected to be bumped from the transportation vehicle from the number of needed seats;

computer-readable program code for identifying the first bump passenger in the sorted plurality of bump passengers;

computer-readable program code for identifying a group size of the first bump passenger, the group size being equal to a number of bump passengers traveling in the group with the first bump passenger including the first bump passenger;

computer-readable program code for selecting the first bump passenger and any bump passengers traveling in a group with the first bump passenger to be bumped from the transportation vehicle in response to a determination that the group size of the first bump passenger does not exceed the number of still-needed seats on the transportation vehicle; and computer-readable program code for removing the first bump passenger and any bump passengers traveling in a group with the first bump passenger from the sorted plurality of bump passengers.

16. The non-transitory computer-readable medium of claim 15, wherein the plurality of bump passengers further comprises a second bump passenger and a third bump passenger, wherein the computer-readable program code for sorting the plurality of bump passengers comprises:

computer-readable program code for determining a first cost associated with providing a first incentive to the second bump passenger, the first incentive being based on the bump bid of the second bump passenger; and computer-readable program code for determining a second cost associated with providing a second incentive to the third bump passenger, the second incentive being based on the bump bid of the third bump passenger, wherein the bump bid of the second bump passenger comprises a selection of a first replacement flight and a first voucher for use toward subsequent travel, the first voucher having a first amount, wherein the bump bid of the third bump passenger comprises a selection of a second replacement flight and a second voucher for use toward subsequent travel, the second voucher having a second amount, wherein the first amount exceeds the second amount, and wherein the second cost exceeds the first cost.

17. A computer-implemented method for bumping passengers from a transportation vehicle comprising:
  receiving, by a computer, a bump bid for each of a plurality of bump passengers having a ticket for the transportation vehicle, the plurality of bump passengers comprising at least a first bump passenger and a second bump passenger;
  determining, by a computer, a first cost associated with providing a first incentive to the first bump passenger, the first incentive being based on the bump bid of the first bump passenger;
  determining, by a computer, a second cost associated with providing a second incentive to the second bump passenger, the second incentive being based on the bump bid of the second bump passenger;
  comparing, by a computer, the first cost with the second cost; and
  selecting, by a computer, the first bump passenger to bump from the transportation vehicle based on the bump bid for the first bump passenger in response to a determination that the second cost exceeds the first cost;
  wherein the bump bid of the first bump passenger comprises a first type of bid selected from: a request for credits to a frequent traveler account, a request for an upgrade to a higher class of travel on a subsequent transportation vehicle, a request for a voucher for use toward subsequent travel, a request for a monetary payment, a request for a selection of a confirmed seat on a first replacement transportation vehicle, or a request for a selection of a confirmed seat on a second replacement transportation vehicle,
  wherein the bump bid of the second bump passenger comprises a second type of bid selected from: a request for an upgrade to a higher class of travel on a subsequent transportation vehicle, a request for a voucher for use toward subsequent travel, a request for a monetary payment, a request for a selection of a confirmed seat on the first replacement transportation vehicle, or a request for a selection of a confirmed seat on the second replacement transportation vehicle, and
  wherein the first type of bid is different from the second type of bid.

18. The method of claim 17, wherein the first type of bid is selected from:
  a request for an upgrade to a higher class of travel on a subsequent transportation vehicle,
  a request for a voucher for use toward subsequent travel, a request for a monetary payment, or a request for a selection of a confirmed seat on the first replacement transportation vehicle, and
    wherein the second type of bid is selected from: a request for an upgrade to a higher class of travel on a subsequent transportation vehicle, a request for a voucher for use toward subsequent travel, a request for a monetary payment, or a request for a selection of a confirmed seat on the first replacement transportation vehicle.

19. The method of claim 17, wherein receiving, by a computer, a bump bid for each of a plurality of bump passengers having a ticket for the transportation vehicle comprises:
  determining, by a computer, whether at least one bump passenger in the plurality of bump passengers is traveling in a group with at least one other bump passenger.

20. The method of claim 17, wherein the first type of bid comprises a request for a voucher for use toward subsequent travel, the voucher having a first amount,
  wherein the second type of bid comprises a request for a monetary payment, the monetary payment having a second amount, and
  wherein the first amount exceeds the second amount.

* * * * *